United States Patent [19]

Iwata

[11] Patent Number: 4,779,698
[45] Date of Patent: Oct. 25, 1988

[54] SPLIT AXLE DRIVE MECHANISM FOR PART-TIME FOUR-WHEEL DRIVE VEHICLE

[75] Inventor: Hideyuki Iwata, Toyota, Japan

[73] Assignee: Toyota Jidosha Kabushiki Kaisha, Aichi, Japan

[21] Appl. No.: 21,209

[22] Filed: Mar. 3, 1987

[30] Foreign Application Priority Data

Mar. 3, 1986 [JP] Japan .................. 61-030420[U]

[51] Int. Cl.$^4$ ............................................. B60K 23/08
[52] U.S. Cl. .................... 180/247; 74/665 T; 74/713; 192/48.7; 192/85 V
[58] Field of Search ............ 180/233, 247, 248, 252; 74/665 R, 665 F, 665 G, 665 GB, 674, 665 S, 665 T, 710, 713; 192/30 R, 32, 48.1, 48.7, 49, 52, 85 R, 85 V, 85 C

[56] References Cited

U.S. PATENT DOCUMENTS

| | | | |
|---|---|---|---|
| 1,466,379 | 8/1923 | Mason | 192/48.7 |
| 2,758,688 | 8/1956 | Pepper | 192/48.7 |
| 2,913,929 | 11/1959 | Anderson | 180/247 |
| 3,058,558 | 10/1962 | Hawk | 180/247 |
| 3,272,295 | 9/1966 | Clements | 192/48.7 |
| 4,271,722 | 6/1981 | Campbell | 180/247 |
| 4,341,281 | 7/1982 | Nagy | 180/247 |
| 4,373,604 | 2/1983 | Lunn et al. | 180/247 |
| 4,381,828 | 5/1983 | Lunn et al. | 180/247 |
| 4,407,387 | 10/1983 | Lindbert | 180/247 |
| 4,452,331 | 6/1984 | Lunn | 180/247 |
| 4,625,584 | 12/1986 | Onodera | 180/247 |

Primary Examiner—David M. Mitchell
Assistant Examiner—Everett G. Diederiks, Jr.
Attorney, Agent, or Firm—Parkhurst, Oliff & Berridge

[57] ABSTRACT

A split axle drive mechanism for a part-time four-wheel drive vehicle comprises a fist axle shaft connected to one side gear of a differential, a first output member arranged to be connected to the first axle shaft, a second axle shaft axially slidably connected to the other side gear, a second output member arranged to be connected to the second axle shaft, a clutch mechanism disengageable for disconnecting the first axle shaft from the first output member when the vehicle is in a two-wheel drive mode and engageable for connecting the first axle shaft to the first output member when the vehicle is in a four-wheel drive mode, a connecting rod axially slidably disposed in the axle shafts and having one end operatively connected with the clutch mechanism and another end connected with the second axle shaft, a coupling mechanism for connecting the second axle shaft to the second output member in response to engagement of the clutch mechanism, and a shift mechanism arranged to axially translate a clutch sleeve of the clutch mechanism between disengaged and engaged positions. A pneumatic actuator is arranged to operate the shift mechanism, and the coupling mechanism is arranged to connect the second axle shaft to the second output member after engagement of the clutch mechanism under control of the pneumatic actuator.

4 Claims, 4 Drawing Sheets

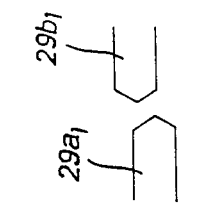
Fig. 4(a)
Fig. 4(b)
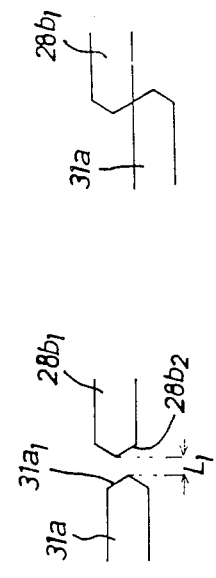
Fig. 3(a)
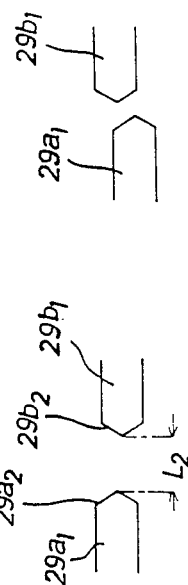
Fig. 3(b)
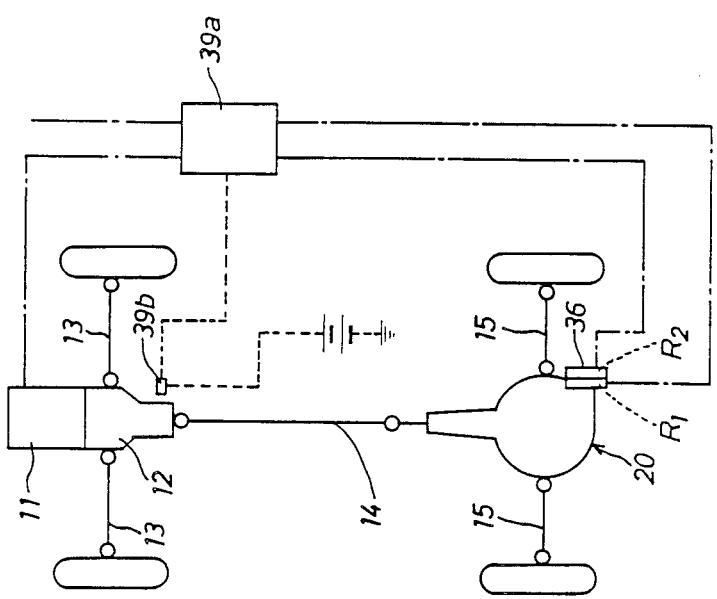
Fig. 2

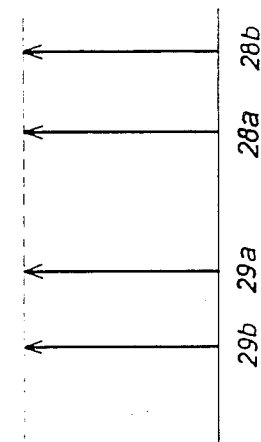
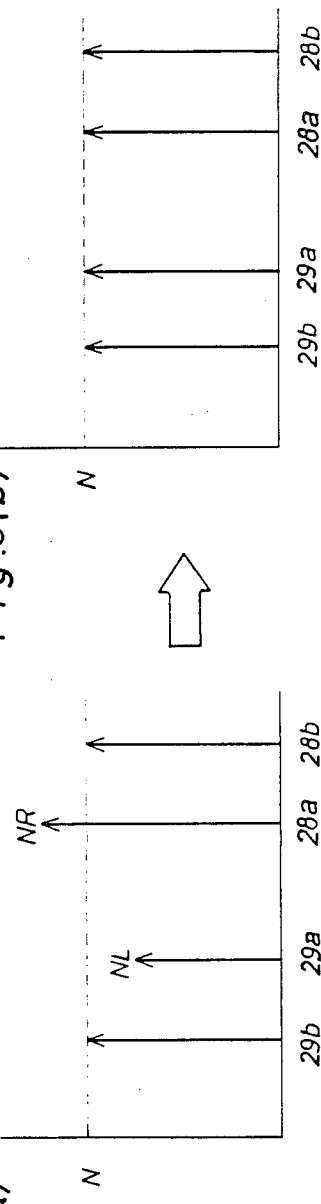
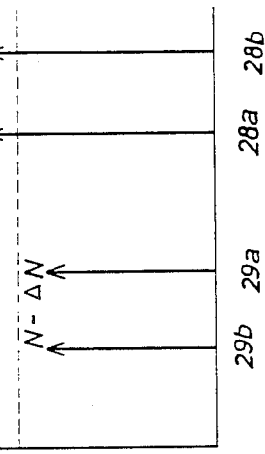
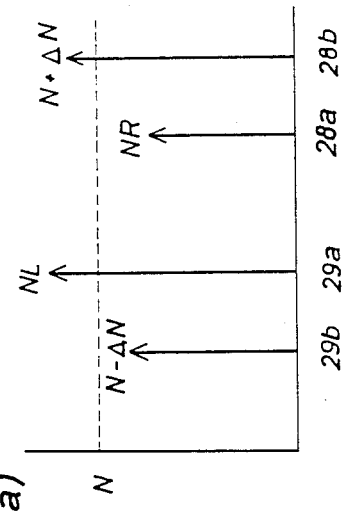

4,779,698

SPLIT AXLE DRIVE MECHANISM FOR PART-TIME FOUR-WHEEL DRIVE VEHICLE

BACKGROUND OF THE INVENTION

1. Field of the Invention

The present invention relates to split axle drive mechanisms, and more particularly to a split axle drive mechanism for part-time four-wheel drive vehicles which include a transfer device adapted to change the operating mode of the vehicle drive system between a two-wheel drive mode and a four-wheel drive mode.

2. Description of the Prior Art

In U.S. Pat. No. 4,625,584 granted to Onodera on Dec. 2, 1986, there has been proposed a split axle drive mechanism which comprises a first axle shaft connected to one side gear of a differential, a first output member arranged to be connected to the first axle shaft, a second axle shaft axially slidably connected to another side gear of the differential, a second output member arranged to be connected to the second axle shaft, a clutch mechanism disengageable for disconnecting the first axle shaft from the first output member when the vehicle is in a two-wheel drive mode and engageable for connecting the first axle shaft to the first output member when the vehicle is in a four-wheel drive mode, a connecting rod axially slidably disposed in the axle shafts and operatively connected at its one end with the clutch mechanism and at its other end with one end of the second axle shaft to be maintained in a first position for disconnecting the second axle shaft from the second output member in response to disengagement of the clutch mechanism and to be moved from the first position to a second position for connecting the second axle shaft to the second output member in response to engagement of the clutch mechanism, and a shift mechanism arranged to axially translate a clutch sleeve of the clutch mechanism between disengaged and engaged positions, the shift mechanism including a remotely controlled slide rod, and a lever arm connected at its one end with the slide rod and engaged at its other end with the clutch sleeve.

In the split axle drive mechanism, a coupling mechanism between the connecting rod and the second axle shaft and a coupling mchanism between the slide rod and the lever arm are arranged to connect the second axle shaft to the second output member after engagement of the clutch mechanism for effecting smooth meshing engagement between a spline wheel or the second axle shaft and an internally splined portion of the second output member. However, the coupling mechanisms are complicated in construction.

SUMMARY OF THE INVENTION

It is, therefore, a primary object of the present invention to provide an improved split axle drive mechanism which is capable of effecting smooth coupling between the second axle shaft and the second output member in a simple construction without providing such complicated coupling mechanisms as described above.

According to the present invention, the primary object is attained by providing a split axle drive mechanism for a part-time four-wheel drive vehicle which comprises a differential housing, a differential case rotatably mounted within the housing, the differential case being provided thereon with a ring gear for rotation about a first axis and therein with a pinion for rotation about a second axis orthogonal to the first axis and a pair of side gears in meshing engagement with the pinion gear for rotation about the first axis, a first axle shaft disposed along the first axis and connected to one of the side gears for rotation therewith, a second axle shaft disposed along the first axis and axially slidably connected to the other side gear for rotation therewith, a first output member disposed along the first axis to be connected to the first axle shaft, and a second output member disposed along the first axis to be connected to the second axle shaft.

The split axle drive mechanism further comprises a clutch mechanism disengageable for disconnecting the first axle shaft from the first output member when the vehicle is in a two-wheel drive mode and engageable for connecting the first axle shaft to the first output member when the vehicle is in a four-wheel drive mode, the clutch mechanism including a spline wheel provided on an outer end of the first axle shaft, a matching spline wheel provided on an inner end of the first output member, and an internally splined clutch sleeve axially slidably mounted on the spline wheel on the first axle shaft and shiftable between a disengaged position where it disengages from the matching spline wheel and an engaged position where it couples the spline wheels to connect the first axle shaft to the first output member, a connecting rod interconnecting the second axle shaft to the clutch sleeve, coupling means for connecting the second axle shaft to the second output member when the clutch sleeve is moved from the disengaged position to the engaged position and for disconnecting the second axle shaft from the second output member when the clutch sleeve is moved from the engaged position to the disengaged position, and a shift mechanism arranged to axially translate the clutch sleeve between the disengaged and engaged positions, the shift mechanism including a slide rod axially slidably mounted within a portion of the differential housing and arranged in parallel with the first axle shaft, and a shift fork fixed to the slide rod at it one end and engaged with the clutch sleeve at its other end.

In the split axle drive mechanism, the shift mechanism comprises a pneumatic actuator arranged to axially translate the slide rod, the pneumatic actuator including a housing assembly mounted on the differential housing coaxially with the slide rod, and a movable wall assembled within the housing assembly to internally subdivide the housing assembly into a pair of pressure chambers and being connected to an outer end of the slide rod, and the coupling means is arranged to connect the second axle shaft to the second output member after meshing engagement of the clutch sleeve with the matching spline wheel on the first output member.

BRIEF DESCRIPTION OF THE DRAWINGS

Additional objects, features and advantages of the present invention will be readily appreciated from the following detailed description of a preferred embodiment thereof when considered with reference to the accompanying drawings, in which:

FIG. 2 is a schematic plan view of a part-time four-wheel drive vehicle equipped with the split axle drive mechanism shown in FIG. 1;

FIG. 3(a) illustrates a distance between an internally splined clutch sleeve on a first axle shaft and an externally splined wheel on a first output member in a disengaged condition of a clutch mechanism shown in Fig.1;

FIG. 3(b) illustrates a distance between an externally splined wheel on a second axle shaft and an internally splined wheel integral with a second output member in the disengaged position of the clutch mechanism;

FIG. 4(a) illustrates the internally splined clutch sleeve brought into meshing engagement with the externally splined wheel in shifting operation of the clutch mechanism;

FIG. 4(b) illustrates a distance between the externally splined wheel on the second axle shaft and the internally splined wheel of the second output member in shifting operation of the clutch mechanism;

FIGS. 5(a) and 5(b) illustrate a relationship between rotational numbers of the axle shafts and output members for synchronization during straight travel of the vehicle;

FIGS. 6(a) and 6(b) illustrate a relationship between rotation numbers of the axle shafts and output members for synchronization during turning of the vehicle.

DESCRIPTION OF THE PREFERRED EMBODIMENT

Figure 1:
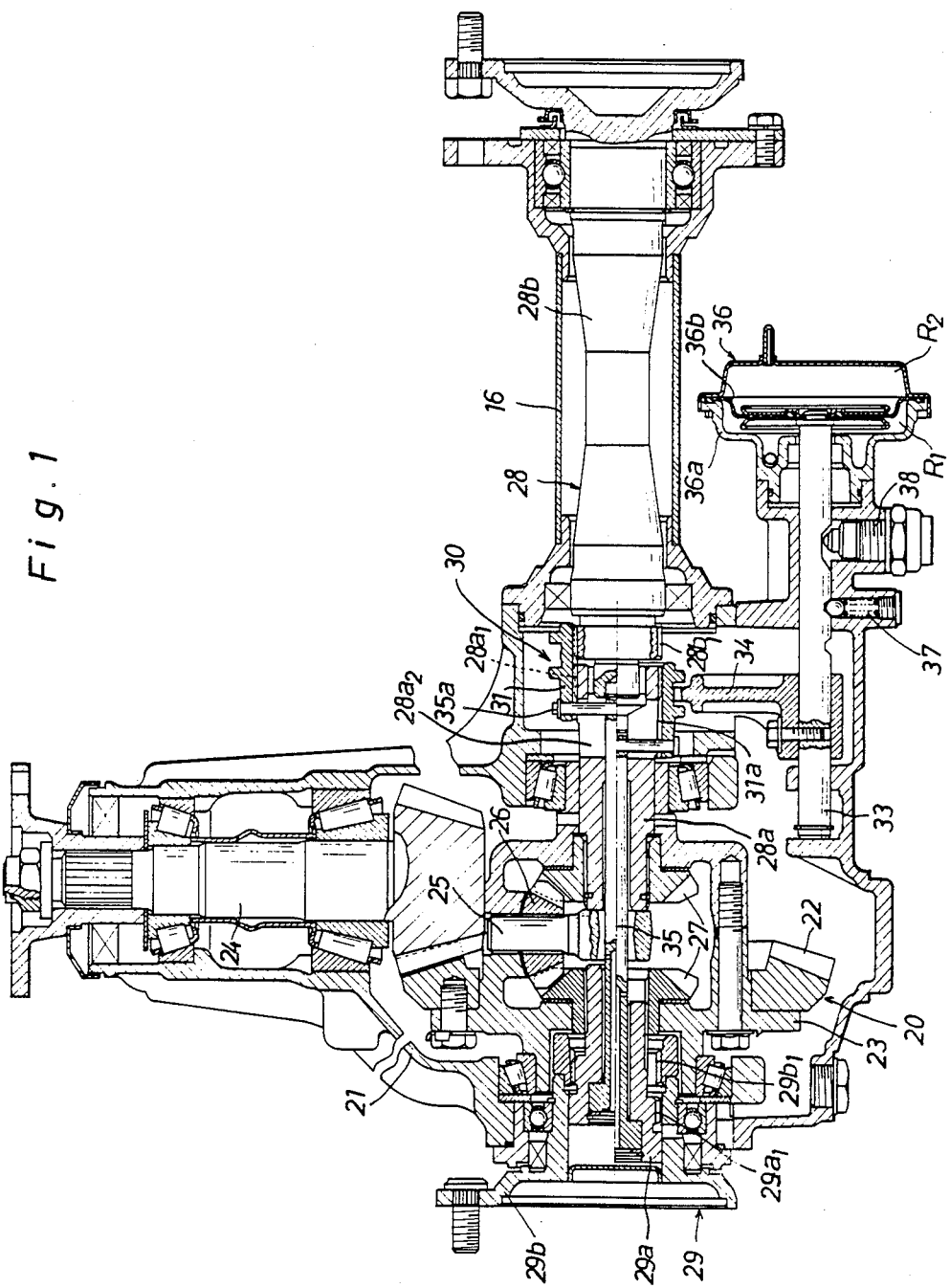
FIG. 1 is a sectional plan view of a split axle drive mechanism in accordance with the present invention.

Referring now to the drawings, in particularly to FIG. 2, there is schematically illustrated a part-time four-wheel drive vehicle of the front-engine front-wheel drive type, which comprises an internal combustion engine 11 mounted on the front portion of a vehicle body structure, and a transfer device 12 attached to the rear end of engine 11 through a transmission in a well-known manner. The transfer device 12 includes an input shaft in drive connection to an output shaft of the transmission, a primary output shaft in drive connection to the input shaft in the transfer device 12, and a secondary output shaft drivingly connectable to the input shaft by means of a remotely controlled clutch mechanism in the transfer device 12. The primary output shaft of transfer device 12 is drivingly connected to a pair of front split axle parts 13 to drive a pair of front dirigible road wheels, while the secondary output shaft of transfer device 12 is drivingly connected to a propeller shaft 14 which in turn is drivingly connected to a pair of rear split axle parts 15 by way of a split axle drive mechanism 20 in accordance with the present invention. As will be described in detail later, the split axle drive mechanism 20 is adapted to selectively drive a pair of rear road wheels through the rear split axle parts 15 when a four-wheel drive mode is selected at the transfer device 12.

As shown in FIG. 1, the split axle drive mechanism 20 is in the form of a differential which comprises a differential housing 21 provided with a lateral extension tube 16 attached thereto, and a differential case 23 and a drive pinion shaft 24 rotatably mounted within the differential housing 21 on orthogonally related axes. The drive pinion shaft 24 is drivingly connected to the rear end of propeller shaft 14 and has a pinion permanently meshed with a ring gear 22 attached to the differential case 23. The differential case 23 carries a pair of rotatable pinion gears 26 each mounted on a cross pin 25. The pinion gears 26 are in meshing engagement with a pair of side gears 27 which are rotatably mounted in the differential case 23 and connected respectively to split axle shaft assemblies 28 and 29. The right-hand split axle shaft assembly 28 includes a first axle shaft 28a rotatably mounted within the differential housing 21 and splined at its inner end to the right-hand side gear 27 for rotation therewith, while the left-hand split axle shaft assembly 29 includes a second axle shaft 29a arranged coaxially with the first axle shaft 28a and axially slidably splined at its inner end to the left-hand side gear 27 for rotation therewith.

The first axle shaft 28a is provided at its outer end with an integral spline wheel $28a_1$ and a radial slot $28a_2$. Arranged coaxially with the first axle shaft 28a is a first output member 28b in the form of an extension shaft which extends into the extension tube 16 through the differential housing 21 in a liquid-tight manner. The extension shaft 28b has an inner end coupled with the outer end of axle shaft 28a for relative rotation and an outer end rotatably carried on a ball bearing at the outer end of extension tube 16. The extension shaft 28b is integrally provided at its inner end with a matching spline wheel $28b_1$ and at its outer end with an external flange for attachment with the right-hand rear split axle part 15. The second axle shaft 29a is rotatably coupled within a cylindrical portion of a second output member in the form of an external flange 29b which is rotatably mounted in the differential housing 21 in a liquid-tight manner for attachment with the left-hand rear split axle part 15. The second axle shaft 29a is formed with an integral spline wheel $29a_1$, while the external flange 29b is integrally provided at its inner end with an internally splined sleeve $20b_1$ to be brought into meshing engagement with the spline wheel $29a_1$ of axle shaft 29a.

To selectively establish drive connection between the rear split axle parts 15, the split axle drive mechanism 20 comprises a clutch mechanism 30 which includes an internally splined clutch sleeve 31 slidably mounted on the spline wheel $28a_1$ of axle shaft 28a. The splined clutch sleeve 31 is shiftable between a disengaged position shown by a lower half in the figure and an engaged position where it couples the spline wheels $28a_1$ and $28b_1$. The clutch mechanism 30 further includes a cross rod 35a extending across the radial slot $28a_2$ in axle shaft 28a and fixed at its opposite ends to the splined clutch sleeve 31, and a connecting rod 35 axially slidably disposed within the axles shafts 28a and 29a. The connecting rod 35 has an inner end connected to the cross rod 35a and at outer end fixedly coupled with the left-hand axle shaft 29a.

The split axle drive mechanism 20 further comprises a shift mechanism which includes a shift fork 34 slidably mounted on a slide rod 33 at its base and engaged with an external groove of the splined clutch sleeve 31 at its yoke. The slide rod 33 is axially slidably mounted within one side portion of differential housing 21 and arranged in parallel with the split axle shaft assembly 28. The slide rod 33 is connected at its outer end with a pneumatic actuator 36 to be translated and is selectively retained by a detent mechanism 37 to position the shift fork 34 in a shifted position. In the occurrence of unexpected damage of a vacuum supply system for the pneumatic actuator 36, the detent mechanism 37 acts as a fail-safe mechanism to retain the slide rod 33 in its shifted position. A switch assembly 38 is attached to the differential housing 21 to detect the shifting operation of slide rod 33 so as to indicate the disengaged or engaged position of the clutch mechanism 30.

The pneumatic actuator 36 is in the form of a vacuum motor of the diaphragm type which includes a housing assembly 36a fixedly coupled in an air-tight manner with the differential housing 21 to contain therein the outer end of slide rod 33, a diaphragm piston assembly 36b secured at its outer periphery with the housing assembly 36a to internally subdivide the housing assembly 36a into a pair of pressure chambers $R_1$ and $R_2$ and being connected to the outer end of slide rod 33. As shown in FIG. 2, the pressure chambers $R_1$, $R_2$ are connected to a vaccum switching valve 39a in the form of an electrically operated changeover valve which is connected to a normally open switch 39b mounted on the transfer device 12. The normally open switch 39b is arranged to be maintained in its open position when a two-wheel drive mode is selected at the transfer device 12 and to be closed when a four-wheel drive mode is selected at the transfer device 12.

With such an arrangement as described above, the changeover valve 39a is maintained in its deenergized condition during the two-wheel drive mode of operation of the vehicle to connect the pressure chambers $R_1$ and $R_2$ respectively to vaccum in an intake manifold of the engine 11 and the atmospheric air. When the four-wheel drive mode is selected at the transfer device 12 to close the normally open switch 39b, the changeover valve 39a is energized to connect the pressure chambers $R_1$ and $R_2$ respectively to the atmospheric air and vacuum in the intake manifold of the engine 11.

In the clutch mechanism 30, as shown in FIG. 3(a), internal splines 31a of the clutch sleeve 31 each are formed with a chamfer $31a_1$, while external splines of the spline wheel $28b_1$ each are formed with a chamfer $28b_2$. In the left-hand split axle shaft assembly 29, as shown in FIG. 3(b), external splines of the spline wheel $29a_1$ each are formed with a chamfer $29a_2$, while internal splines of the spline wheel $20b_1$ each are formed with a chamfer $20b_2$. When the clutch sleeve 31 is retained in the disengaged position the chamfer $31a_1$ of the respective internal splines 31a is axially spaced in a distance $L_1$ from the chamfer $28b_2$ of the respective external splines $28b_1$, while the chamfer $29a_2$ of the respective external splines $29a_1$ is axially spaced in a distance $L_2$ larger than the distance $L_1$ from the chamfer $29b_2$ of the respective internal splines $20b_1$.

In operation, the splined clutch sleeve 31 is retained in the disengaged position when the two-wheel drive mode is being selected at the transfer device 12 to disconnect the drive to the propeller shaft 14. In such a condition, the normally open switch 39b is maintained in its open position so that the changeover valve 39a is maintained in its deenergized condition to connect the pressure chambers $R_1$ and $R_2$ of the pneumatic actuator 36 respectively to vacuum in the intake manifold of the engine 11 and the atmospheric air. As a result, the pneumatic actuator 36 is conditioned to retain the slide rod 33 in the position shown in FIG. 1. Thus, the non-driven rear road wheels back drive only the extension shaft 28b and external flange 29b but do not back drive the axle shafts 28a, 29a, components in the differential case 23, drive pinion shaft 24, propeller shaft 14 and components connected to the secondary output shaft in the transfer device 12. This mode of operation reduces undesired noises in the non-driven system and eliminates wear and power consumption in the split axle drive mechanism 20 caused by back drive of the non-driven rear road wheels.

When the four-wheel drive mode is selected at the transfer device 12 to drive the propeller shaft 14, the drive pinion shaft 24, ring gear 22 and differential case 23 are driven at a rotational speed N, and the right-hand side gear 27, axle shaft 28a, clutch sleeve 31 and connecting rod 35 are driven at a rotational speed NR, while the left-hand side gear 27 and axle shaft 29a are driven at a rotational speed NL. In this instance, the normally open switch 39b is closed, and in turn, the changeover valve 39a is energized to connect the pressure chambers $R_1$ and $R_2$ of pneumatic actuator 36 respectively to the atmospheric air and vaccum in the intake manifold of the engine 11. As a result, the pneumatic actuator 36 is operated to shift the slide rod 33 rightward, and in turn, the detent mechanism 37 acts to permit rightward movement of the slide rod 33. Thus, the shift fork 34 is moved rightward by the slide rod 33 to shift the splined clutch sleeve 31 toward its engaged position. Simultaneously, the connecting rod 35 is moved rightward by the splined clutch sleeve 31, and in turn, the spline wheel $29a_1$ of axle shaft 29a is brought into meshing engagement with the internally splined sleeve $20b_1$ of external flange 29b.

If in such shifting operation the splined clutch sleeve 31 is synchronized in rotation to the extension shaft 28b, it will be smoothly engaged with the spline wheel $28b_1$ to connect the axle shaft 28a to the extension shaft 28b. (see FIG. 4(a)) If the splined clutch sleeve 31 is not synchronized in rotation to the extension shaft 28b, it will be resiliently engaged at its chamfers $31a_1$ with the chamfers $28b_2$ of spline wheel $28b_1$ under load of the pneumatic actuator 36 and subsequently engaged with the spline wheel $28b_1$ to connect the axle shaft 28a to the extension shaft 28b. Thus, the split axle drive mechanism 20 operates as a conventional differential to transmit the power from drive pinion shaft 24 to the rear split axle parts 15 for the four wheel drive.

Assuming that the shifting operation of clutch sleeve 31 is conducted during straight travel of the vehicle, the extension shaft 28b and external flange 29b are driven at the same rotational speed N as that of the differential case 23, as shown in FIG. 5(a). When the rotational speed of clutch sleeve 31 is synchronized with the rotational speed N of extension shaft 28b and external flange 29b, as shown in FIG. 5(b), the rotational speed of axle shaft 29a becomes equal to the rotational speed N under control of the differential mechanism in case 23. Assuming that the shifting operation of clutch sleeve 31 is conducted during turning travel of the vehicle, the extension shaft 28b is driven at a rotational speed of $N+\Delta N$, while the external flange 29b is driven at a rotationa speed of $N-\Delta N$, as shown in FIG. 6(a). When the rotational speed of clutch sleeve 31 is synchronized with the rotational speed $N+\Delta N$ of extension shaft 28b, the rotational speed of axle shaft 29a becomes equal to the rotational speed $N-\Delta N$ of external flange 29b, as shown in FIG. 6(b). Accordingly, when the clutch sleeve 31 is engaged with the spline wheel $28b_1$ of extension shaft 28b in the shifting operation, the spline wheel $29a_1$ of axle shaft 29a is synchronized with the internally splined sleeve $20b_1$ of external flange 29b for effecting smooth meshing engagement therewith. In addition, if such synchronization between the axle shaft 29a and external flange 29b is not effected during turning of the vehicle at a small radius or travel of the vehicle on a waste road, the spline wheel $29a_1$ of axle shaft 29a will be resiliently engaged at its chamfers $29a_2$ with the chamfers $20b_2$ of external flange 29b under load of the pneumatic actuator 36.

When the two-wheel drive mode is selected at the transfer device 12 to disconnect the drive from the propeller shaft 14, the normally open switch 39b is opened to deenergize the changeover valve 39a. As a result, the changeover valve 39a is conditioned to connect the pressure chambers $R_1$ and $R_2$ of pneumatic actuator 36 to vacuum in the intake manifold of the engine 11 and the atmospheric air. Thus, the pneumatic actuator 36 is operated to shift the slide rod 33 leftward and in turn the splined clutch sleeve 31 is returned by the shift fork 34 to the disengaged position to disconnect the axle shafts 28a, 29a from the extension shaft 28b and external flange 29b, respectively.

As is understood from the foregoing description, the split axle drive mechanism 20 is characterized in that the pneumatic actuator 36 is adapted to effect shifting movement of the slide rod 33 and that the spline wheel $29a_1$ of axle shaft 29a is axially spaced from the internally splined sleeve $20b_1$ of external flange 29b in a distance larger than a distance between the clutch sleeve 31 and the spline wheel $28b_1$ of extension shaft 28b in a condition where the clutch sleeve 31 is in the disengaged position. With the above arrangement, the pneumatic actuator 36 acts to establish meshing engagement between the spline wheel $29a_1$ and the internally splined sleeve $20b_1$ with a time delay after mshing engagement between the clutch sleeve 31 and the spline wheel $28b_1$.

Figure 7:
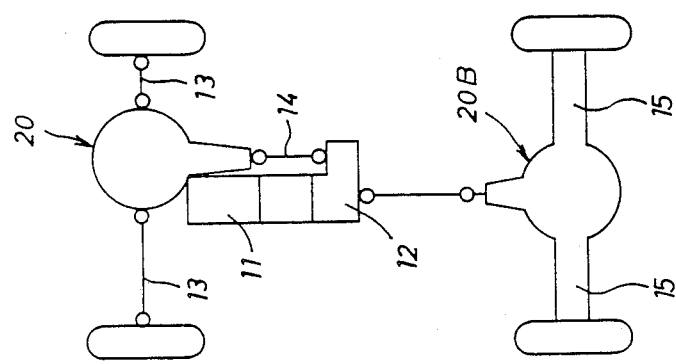
FIG. 7 is a schematic illustration of an application of the split axle drive mechanism to another type of part-time four-wheel drive vehicle.

Although in the above embodiment the split axle drive mechanism 20 has been adapted to a part-time four wheel drive vehicle of the front-engine front-wheel drive vehicle, it may be adapted to a part-time four wheel drive vehicle of the front-engine rear-wheel drive type as shown in FIG. 7, wherein the primary output shaft of transfer device 12 is drivingly connected to a pair of rear split axle parts 15 through a conventional rear differential 20B, while the secondary output shaft of transfer device 12 is drivingly connected to a propeller shaft 14 which in turn is drivingly connected to a pair of front split axle parts 13 by way of the split axle drive mechanism 20.

Having now fully set forth structure and operation of a preferred embodiment of the concept underlying the present invention, various other embodiments as well as certain modifications and variations of the embodiment shown and described herein will obviously occur to those skilled in the art upon becoming familiar with the underlying concept. It is to be understood, therefore, that within the scope of the appended claims, the invention may be practiced otherwise than as specifically set forth herein.

What is claimed is:

1. A split axle drive mechanism for a part-time four-wheel drive vehicle, comprising:
   a differential housing;
   a differential case rotatably mounted within said housing, said differential case being provided thereon with a ring gear for rotation about a first axis and therein with a pinion for rotation about a second axis orthogonal to said first axis and a pair of side gears in meshing engagement with said pinion for rotation about said first axis;
   a first axle shaft disposed along said first axis and connected to one of said side gears for rotation therewith;
   a second axle shaft disposed along said first axis and axially slidably connected to the other side gear for rotation therewith;
   a first output member disposed along said first axis to be connected to said first axle shaft;
   a second output member disposed along said first axis to be connected to said second axle shaft;
   a clutch mechanism including a spline wheel provided on an outer end of said first axle shaft, a matching spline wheel provided on an inner end of said first output member, and an internally splined clutch sleeve axially slidably mounted on said spline wheel of said first axle shaft and shiftable between a first position where it disengages from said matching spline wheel to disconnect said first axle shaft from said first output member and a second position where it couples said spline wheels to connect said first axle shaft to said first output member;
   a connecting rod axially movably disposed in said first and second axle shafts and having one end connected to said clutch sleeve and another end coupled within an outer end of said second axle shaft for axial movement therewith;
   coupling means including an internally splined sleeve integral with said second output member and a spline wheel provided on said second axle shaft to be brought into meshing engagement with said internally splined sleeve when said clutch sleeve is moved from the first position to the second position; and
   a shift mechanism including a slide rod axially slidably mounted within a portion of said differential housing and arranged in parallel with said first axle shaft, a shift fork fixed to said slide rod at one end thereof and coupled with said clutch sleeve at another end thereof;
   wherein said shift mechanism comprises a pneumatic actuator arranged to axially translate said slide rod, said pneumatic actuator including a housing assembly mounted on said differential housing coaxially with said slide rod, and a movable wall assembled within said housing assembly to internally subdivide said housing assembly into a pair of pressure chambers and being connected to said slide rod, and
   wherein said spline wheel of said second axle shaft is axially spaced from said internally splined sleeve of said second output member in a distance greater than a distance between said clutch sleeve and said matching spline wheel of said first output member when said clutch sleeve is positiond in the first position.

2. A split axle drive mechanism as recited in claim 1, wherein said second output member is in the form of an external flange rotatably mounted within said differential housing and having a cylindrical portion arranged in surrounding relationship with the outer end of said second axle shaft for relative rotation, said cylindrical portion being integral with said internally splined sleeve for engagement with said spline wheel of said second axle shaft.

3. A split axle drive mechanism as recited in claim 1, wherein said first output member has an outer end adapted for attachment to one split axle part for driving one of a pair of road wheels, and said second output member has an outer end for attachment to another split axle part for driving the other road wheel.

4. A split axle drive mechanism as recited in claim 1, further comprising an electrically operated changeover valve connected to the pressure chambers in said housing assembly of said pneumatic actuator for selectively connecting the pressure chambers to vaccum in an intake manifold of an internal combustion engine of the vehicle and the atmospheric air in response to change of the operating mode of the vehicle drive system from a four-wheel drive mode to a two-wheel drive mode.

* * * * *